United States Patent [19]

Hegele

[11] Patent Number: 4,582,443
[45] Date of Patent: Apr. 15, 1986

[54] ARRANGEMENT FOR THE DETACHABLE FASTENING OF AN END OF AN ELONGATED MEMBER

[76] Inventor: Franz Hegele, Saarlandstrasse 27, D-8011 Neukeferloh, Fed. Rep. of Germany

[21] Appl. No.: 461,482

[22] Filed: Jan. 27, 1983

[30] Foreign Application Priority Data

Feb. 2, 1982 [DE] Fed. Rep. of Germany ....... 3203372

[51] Int. Cl.$^4$ ............................ B25G 3/00; F16B 2/00
[52] U.S. Cl. .......................................... 403/9; 403/20; 403/209; 16/114 R
[58] Field of Search ............... 403/209, 215, 105, 252, 403/9.20; 16/125, 114 R; 292/52 A, 52 AC

[56] References Cited

U.S. PATENT DOCUMENTS 3,176,326 4/1965 Zysman et al. ............... 16/114 R X

FOREIGN PATENT DOCUMENTS 2113202 6/1972 France .

Primary Examiner—Andrew V. Kundrat
Attorney, Agent, or Firm—Toren, McGeady, Stanger, Goldberg & Kiel

[57] ABSTRACT

In an arrangement for detachable fastening of an end of an elongated member, particularly an end of a foot loop band, in a hole having an undercut, particularly in a sailing borrd, it is suggested that at the end of the elongated member there is a pawl of deformable material which is to be pressed against spring action to the end section of the elongated member leading to the end. During insertion of the end section into the hole, the pawl engages with its end face behind the undercut and thus is secured in the hole.

7 Claims, 5 Drawing Figures

ARRANGEMENT FOR THE DETACHABLE FASTENING OF AN END OF AN ELONGATED MEMBER

The invention relates to an arrangement for the detachable fastening of an end of an elongated member.

The invention relates in particular to the construction of a foot loop for sailing boards and its fastening elements in such a way that the connection of the foot loop and the fastening element loosens when a maximum allowable tension, acting on the foot loop, is exceeded, and that the foot of the sailor is consequently released. This requirement of a predeterminable, maximum allowable release force is to be met if possible for all directions of tension, occurring in practical use, and also for forces which result from moments. It is, for instance, very important that the forces which act parallel to the surface of the sailing board against the moving direction on the foot of the sailor during the collision with a stationary obstacle or with another watercraft do not exceed a maximum allowable value.

These requirements are met according to the invention in that either the ends of the foot loop band are bent to a sort of barb or pawl and are snapped into the undercut of the fastening element, or that the construction of the foot loop ends to a pawl which engages resiliently into the undercut of the fastening element takes place already during its manufacturing, for instance as a sprayed die casting. The foot loop loosens from its fastening element when the release force is exceeded in that the tension, acting on the foot loop, is diverted as compressive force onto the pawl and that consequently the pawl (a) bulges out, (b) is partially or completely pulled into or pressed into the transition area or bending area to the foot loop band, or that (c) any combination of these deformations cause the pawl to slide out of the fastening element. It is obviously only of minor influence under what angle a tension acts on the foot loop because the foot loop is always deflected at the upper edges of the fastening elements and then, as described above, effects a deformation of the pawl.

The release force for the maximum allowable stress on the physical characteristics of the sailor is predetermined either by means of a correspondingly dimensioned construction of the pawl or (d) by changing the geometry of the undercut in the fastening element in such a way that at an appropriate construction of the pawl the latter must be deformed to a varying extent until it slides out of the fastening element.

It obviously depends on the material, used for the pawl, and its construction, as well as on the type of deformation until the release point is reached whether this deformation is plastic and irreversible or elastic and reversible. The use of the described functional principle would consequently be conceivable for a throw-away foot loop which, due to a plastic deformation of the pawl, must be replaced after it has been released once.

Contrary to a desired breaking point, here no part of the foot loop remains in the fastening element. Also the release force can be more exactly predetermined than is possible in a desired breaking point, particularly in view of fatigue limit under alternating load and considering the notch effect of a desired breaking point. Another advantage of this throw-away foot loop is that by selecting very small deformation radii through which the pawl is forced during release and which consequently deform the pawl plastically, a high holding or release force can be achieved with elements which are small and lightweight. If larger, elastically reversible bending radii for the pawls of a reusable foot loop construction are specified, a larger cross-section of the structural parts is required.

Fastening of the foot loop in its fastening elements takes place, as already mentioned, by simply sliding or snapping the pawl into the undercut of the fastening element. The foot loop can be loosened from its fastening element in that the resilient pawl is either lifted out of the undercut in the fastening element by pressing against an extension, provided for this purpose, which can be reached with the fingers, or in that this lifting out or pressing together of the pawl takes place by means of a simple tool, for instance a screwdriver, which is applied at the pawl through a recess in the fastening element.

The invention is elucidated below at the exemplified embodiments, referring to the enclosed drawing.

Figure 1:
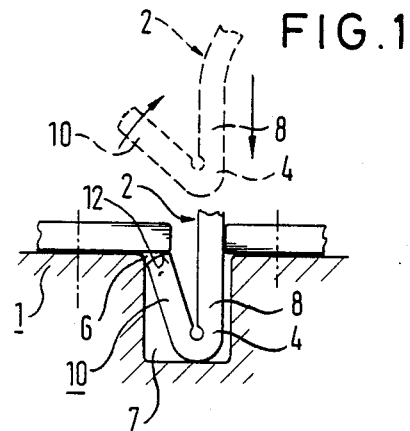
FIG. 1 shows a safety foot loop before it is attached and in the attached state.

All exemplified embodiments relate to a safety foot loop for a sailing board 1 with a foot loop band 2 which is to be detachably fastened with an end 4 in a hole 7 in the sailing board 1 which has an undercut 6. At the end 4 of the foot loop band 2 there is a pawl 10 of deformable material. During insertion of the end section 8 of the foot loop band 2, leading to the end 4, into the hole 7, the pawl engages with its end face 12 behind the undercut 6 and thus is secured in the hole. In the exemplified embodiment, the pawl 10 with the end section 8 of the foot loop band consists of one piece and is made of elastically flexible material.

Figure 3:
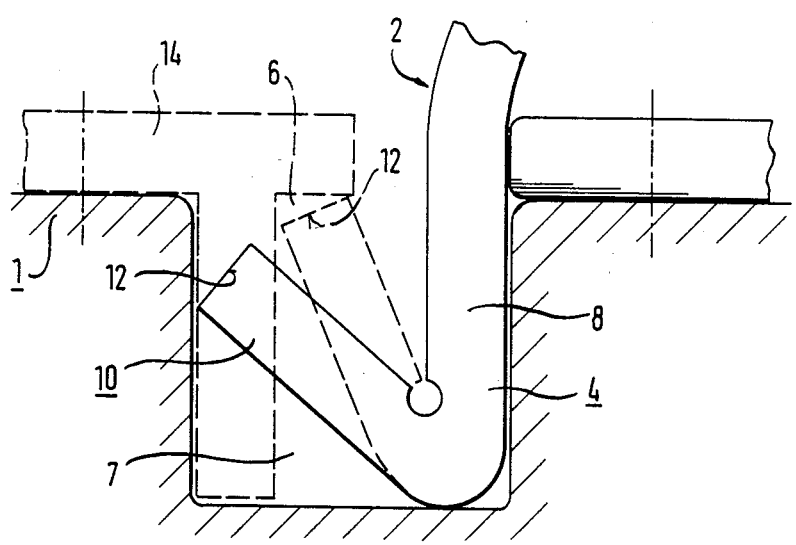
FIG. 3 shows another embodiment of the support of the safety foot loop.

In the exemplified embodiment according to FIG. 3, the undercut 6 is constructed at an insert 14 which limits the hole 7 and is to be attached at the sailing board 1 so it can be exchanged.

Figure 4:
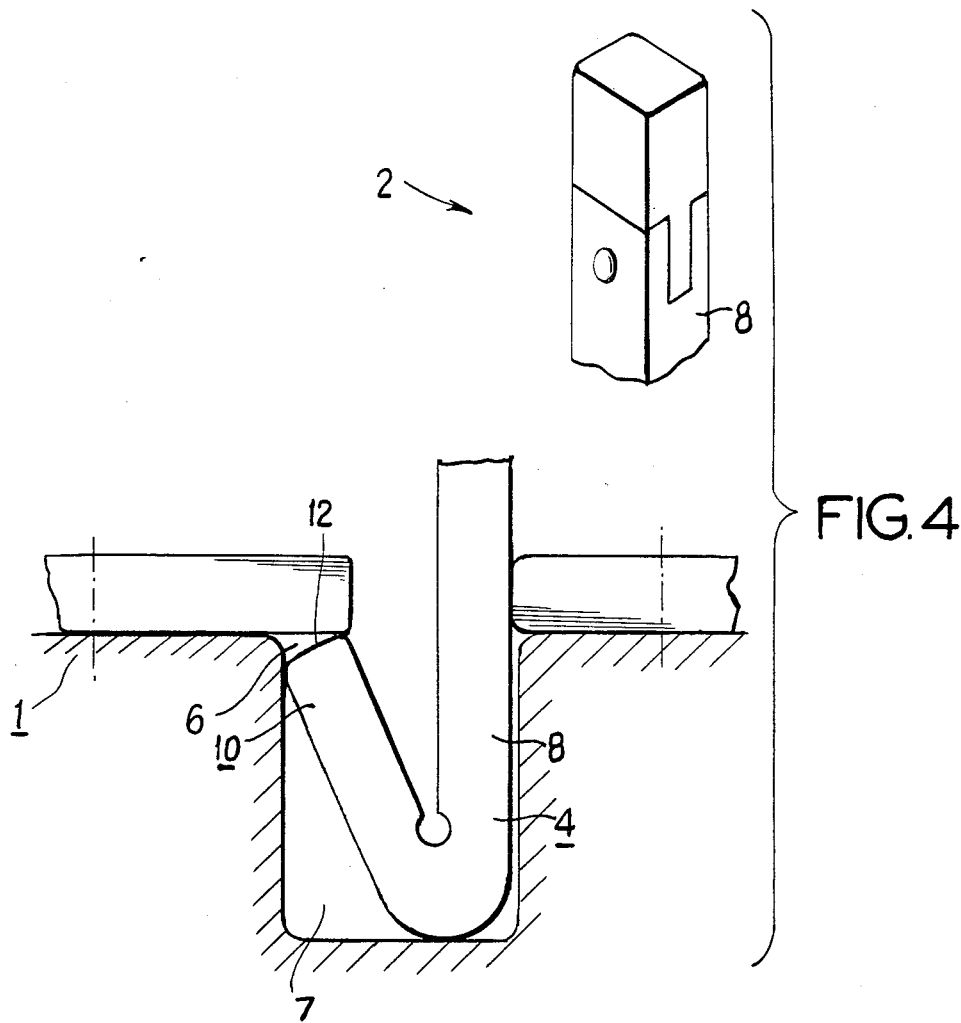
FIG. 4 shows an exchangeable pawl on the safety foot loop.

The pawl 10 may also be attached at the end of the foot loop band 2 so as to be exchangeable, FIG. 4.

At the pawl 10, there may be an extension which projects out of the hole 7 and is also not shown, by means of which the pawl 10 can be released manually.

Figure 5:
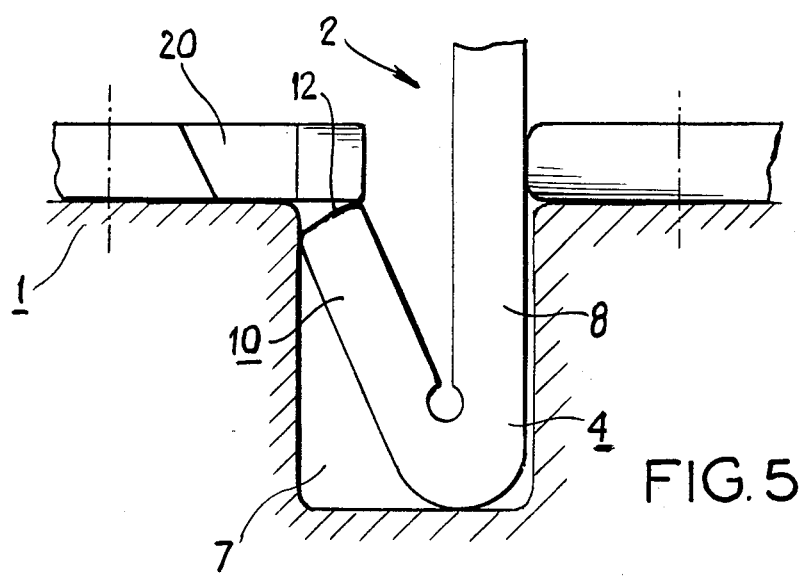
FIG. 5 shows a recess for inserting a tool for disengaging the safety foot loop.

Also a recess 20 leading to the pawl 10, may be provided—into which a tool can be inserted for release of the pawl 10 note FIG. 5.

The fastening principle of the safety foot loop may also be applied for the detachable fastening of rig securing lines, towing lines and the like, for instance instead of spring hooks.

Figure 2:
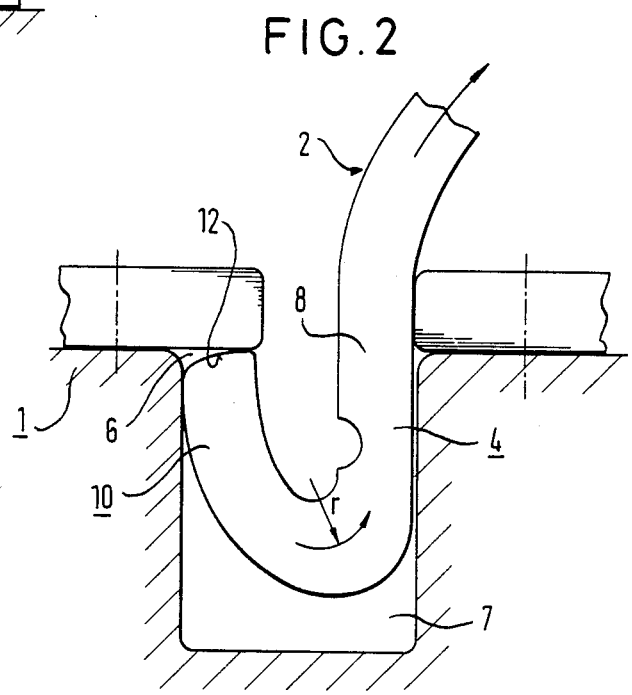
FIG. 2 shows the behavior of the safety foot loop according to FIG. 1 while it is being pulled out.

When the pawl 10 at the end section 8 of the foot loop band 2 is pushed into the hole 7, the pawl 10 locks resiliently behind the undercut 6. During pulling of the foot loop band 2 out of the locked engagement, as visible in FIG. 2, the pawl 10 is upset against the undercut 6, bulges out and is curved with the radius r. When a minimum radius of curvature is exceeded, also the force for further pulling out of the foot loop band 2 is reduced. Thus a locking effect is achieved.

By means of exchangeable inserts 14 in the hole 7 according to FIG. 3, the position of the pawl 10 in its locked engagement and consequently also the maximum force which is required to pull out the foot loop band can be changed.

I claim:

1. In an elongated member, an arrangement for detachably securing an end member (4) of an elongated member (2), in a hole (7) having an entrance to the hole with an undercut (6) formed at the entrance, such as an end member (4) for a foot loop band (2) detachably secured within a hole in sailiing board (1), said end member comprises a first section (8) and an elongated pawl section (10), said first section forming a continuation of said elongated member (2), said pawl secured to one end of said first section and said pawl having an end face spaced from said first section extending transversely of the elongated direction of said pawl, said pawl (10) being bent angularly relative to said first section through an angle at least greater than 90°, said pawl (10) and said first section (8) being insertable to the hole (7) so that said end face (12) of said pawl (10) contacts the undercut (6) within the hole (7) and locks the elongated member (2) within the hole, wherein the improvement comprises that said locking pawl is formed of an elastically flexible material so that as force is applied to said elongated member (2) for removing said end member (4) from the undercut hole (7), an upsetting pressure is applied to said pawl (10) via the undercut (6) at the opening into the hole (7) whereby said pawl gradually forms an aligned extension of said first section until said end face (12) is released from the undercut.

2. An arrangement according to claim 1, characterized in that said pawl (10) with said end section (8) of said elongated member (2) consists of one piece of elastically flexible material.

3. An arrangement according to claim 2, characterized in that said undercut (6) is located at an insert (14) which limits said hole (7) and is to be attached so as to be exchangeable.

4. An arrangement according to claim 1, characterized in that said pawl (10) is attached so as to be exchangeable a said end (4) of said elongated member (2).

5. An arrangement according to claim 1, characterized in that said pawl (10) is located at an extension which projects out of said hole (7) and by means of which said pawl (10) can be manually released.

6. An arrangement according to claim 1, characterized by a recess, leading to said pawl (10), into which a tool can be inserted for disengagement of said pawl (10).

7. In an elongated member an arrangement for detachably securing an end member (4) for the elongated member (2) in a hole (7) having an entrance with an undercut (6) formed at the entrance into said hole, such as an end member (4) for a foot loop band (2) detachably secured within a hole (7) in a sailing board (1), said end member comprises a rectilinear first section (8), said first section having a first end connected to the elongated member and an opposite second end, an arcuate second section at the second end of said first section, an elongated pawl connected to said second section, said first and second sections and said locking pawl consisting of a monolithic unit, said pawl (10) bent angularly relative to said first section (8) through an angle at least greater than 90°, said pawl having an end face spaced from said second section with said end face extending transversely of the elongated direction of said pawl, so that said end face (12) of said pawl (8) contacts the undercut (6) within the hole (7) and locks the elongated member (2) within the hole, wherein the improvement comprises that said locking pawl said second second section and said first section are monolithically formed of an elastically flexible material so that the combination of said pawl said second and said first section have a released position and a locking position with the angle between said pawl in said first section being greater in the released position than in the locking position, said locking pawl having a pair of parallel sides extending in the elongated direction thereof and said end face extending perpendicularly of said parallel sides, said locking pawl having a length in the elongated direction so that in the locking position said end face bears against the undercut in said hole and said second section at the opposite end of said pawl bears against the base of said hole, and when a force is applied to said elongated member (2) for removing said end member (4) from the undercut hole, the force is applied through said first section and said section to said pawl and an upsetting pressure is applied to said pawl via the undercut at the opening into the hole whereby said pawl and said second section gradually form an aligned extension of said first section until said end face is released from the undercut.

* * * * *